US012623627B2

(12) United States Patent     (10) Patent No.:   US 12,623,627 B2

Lohmeier et al.     (45) Date of Patent:     May 12, 2026

(54) MODULAR SYSTEM FOR A BELT TIGHTENER COMPRISING A SPUR GEAR MECHANISM, AND BELT TIGHTENER

(71) Applicant: ZF AUTOMOTIVE GERMANY GMBH, Alfdorf (DE)

(72) Inventors: Michael Lohmeier, Schwabisch Gmünd (DE); Wolfgang Holbein, Alfdorf (DE)

(73) Assignee: ZF AUTOMOTIVE GERMANY GMBH, Alfdorf (DE)

( * ) Notice: Subject to any disclaimer, the term of this patent is extended or adjusted under 35 U.S.C. 154(b) by 0 days.

(21) Appl. No.: 19/106,275

(22) PCT Filed: Aug. 17, 2023

(86) PCT No.: PCT/EP2023/072672

§ 371 (c)(1),
(2) Date: Feb. 25, 2025

(87) PCT Pub. No.: WO2024/041964

PCT Pub. Date: Feb. 29, 2024

(65) Prior Publication Data

US 2026/0061964 A1     Mar. 5, 2026

(30) Foreign Application Priority Data

Aug. 26, 2022    (DE) ..................... 10 2022 121 643.8

(51) Int. Cl.
*B60R 22/46*       (2006.01)

(52) U.S. Cl.
CPC ...... *B60R 22/46* (2013.01); *B60R 2022/4666* (2013.01); *B60R 2022/469* (2013.01)

(58) Field of Classification Search
CPC .................. B60R 2022/4666; B60R 2022/469
See application file for complete search history.

(56) References Cited

U.S. PATENT DOCUMENTS

| | | | |
|---|---|---|---|
| 7,717,215 B2 * | 5/2010 | Tanaka ................... B60R 22/46 |
| | | | 280/806 |
| 10,457,248 B2 * | 10/2019 | Umakoshi .............. B60R 22/34 |

FOREIGN PATENT DOCUMENTS

| | | |
|---|---|---|
| DE | 102017115121 A1 | 1/2018 |
| EP | 1726494 A2 | 11/2006 |

OTHER PUBLICATIONS

PCT International Search Report of the corresponding patent application PCT/EP2023/072672 date of mailing Nov. 7, 2023, 4 pages.

* cited by examiner

*Primary Examiner* — Jason D Shanske
*Assistant Examiner* — Matthew James O'Neill
(74) *Attorney, Agent, or Firm* — Tarolli, Sundheim, Covell & Tummino LLP

(57)        ABSTRACT

A modular system (11) for a belt tensioner (10) comprising a spur gearing (18) comprises plural step wheel pairings of a first step wheel (28) and a second step wheel (30), wherein for each of the step wheel pairings the number of teeth of the first step wheel (28) and the number of teeth of the second step wheel (30) are different from those of the other step wheel pairings, but the distance between a shaft (44) of the first step wheel (28) and the shaft (44) of the second step wheel is equal for each of the step wheel pairings. In addition, the modular system (11) comprises identically designed housings (20) into each of which a spur gearing (18) with one of the step wheel pairings can be introduced.

10 Claims, 5 Drawing Sheets

MODULAR SYSTEM FOR A BELT TIGHTENER COMPRISING A SPUR GEAR MECHANISM, AND BELT TIGHTENER

RELATED APPLICATIONS

This application is a U.S. National Stage Application filed under 35 USC 371, claiming priority to Serial No. PCT/EP2023/072672, filed on 17 Aug. 2023; which claims priority from DE Patent Application 10 2022 121 643.8, filed 26 Aug. 2022, the entireties of which are hereby incorporated herein by reference.

TECHNICAL FIELD

The invention relates to a modular system for a belt tensioner, particularly for a belt tensioner for a seatbelt system, comprising a spur gearing, and to a belt tensioner that is manufactured by such modular system.

BACKGROUND

A belt tensioner is used, in a case of restraint, to reduce certain influences which have a negative effect on restraining a vehicle occupant, before the forward movement of the vehicle occupant begins to move forward and, wherein necessary, a load-limiter starts to be used. Said influences include, for example, the so-called film reel effect and the belt slack. The film reel effect is webbing wound loosely onto a belt reel. In the case of the belt slack, the webbing is only loosely adjacent to the vehicle occupant. The belt tensioner reduces the belt slack and the film reel effect within a split second by winding the webbing onto a belt reel of a belt retractor, for example, and thus tensioning the webbing. Consequently, the vehicle occupant can participate in the vehicle deceleration at an early stage. Moreover, the conditions for the subsequent use of a load-limiter are improved.

Belt tensioners in which, when triggered, a pyrotechnic set is ignited which drives a retracting mechanism are known already. Those belt tensioners can be triggered only once and are designed for the load case of full tensioning, viz. for the event that the vehicle occupant is to be fixed as quickly as possible and with a high degree of force.

Also, belt tensioners are known which are driven using an electric motor, particularly so-called reversible belt tensioners. In this context, "reversible" means that the belt reel can be driven in both directions, on the one hand, to tension the webbing, and, on the other hand, to reverse the tensioning again. For tensioning, the electric motor must provide a high torque at a high speed so that the belt can be tensioned with sufficient force and velocity. It is a particular advantage of the use of electric motors as drive means in belt tensioners that it is possible to operate the belt tensioner many times.

However, those belt tensioners driven by electric motors are usually optimized and designed for the load case of full tensioning.

For example, the electric motor is driven by the 12V power supply of a vehicle in which use is made of the belt tensioner with a maximum feed current in the range from 20 to 40 A. The transmission ratio of the gear transmission of such a belt tensioner is usually within a narrow range from 30 to 35. In these general conditions, tensioning forces ranging from about 100 to 300 N can be achieved within a period of time from about 100 to 150 ms and act upon the shoulder of the vehicle occupant.

Belt tensioners of this type designed for the full tensioning cannot be readily used or easily adapted for different alternative or additional use scenarios. This is desirable, however, to enable further functions of the seatbelt system, for example a warning function generated by means of the webbing or a re-positioning of the vehicle occupant. These different applications usually require deviating transmission ratios, however, which have to be made and implemented in a complicated manner via separate gear transmission and housing developments.

SUMMARY

It is the object of the invention to provide an option that allows to manufacture belt tensioners which can be easily adapted to different use scenarios in a way conserving the resources.

The object is achieved by a modular system for a belt tensioner comprising a spur gearing, the spur gearing including at least one motor gearwheel and at least a first step wheel and a second step wheel, the motor gearwheel forming a first gear stage with the first step wheel and the first step wheel forming a second gear stage with the second step wheel. The modular system comprises plural step wheel pairings of the first step wheel and the second step wheel. The modular system further comprises identically designed housings into each of which a spur gearing including one of the step wheel pairings can be introduced. Each first step wheel and each second step wheel have an opening axially passing through the respective step wheel for holding a shaft, wherein a bearing point of the housing is associated with each shaft. For each of the step wheel pairings, the number of teeth of the first step wheel and the number of teeth of the second step wheel are different from those of the other step wheel pairings, but the distance between the shaft of the first step wheel and the shaft of the second step wheel is equal for each of the step wheel pairings.

The invention is based on the fundamental idea that the belt tensioners are manufactured in a modular system, with the housing of the respective belt tensioner being always identical.

In other words, the modular system according to the invention allows a high degree of standardization using as many same parts as possible, i.e. identical components of the modular system. In this way, the complexity is reduced in the production of the belt tensioner manufactured using the modular system, while at the same time the flexibility in the manufacturing process can be increased. In this way, customer requests can be customized. In addition, stock-keeping of components and different types of belt tensioners can be facilitated, allowing the total manufacturing costs of the belt tensioners to be reduced.

In known belt tensioners, a plurality of components of the belt tensioner has to be adapted when a deviating transmission ratio is to be implemented in order to realize an additional or alternative case of application. In particular, all gearwheels involved, the bearing points thereof, the shape of the housing and of possible covers as well as the type and positioning of motor or, resp., electric motor have to be adapted.

In the modular system according to the invention, on the other hand, only an adaptation of the first step wheel and the second step wheel is necessary, wherein only the toothing of the respective step wheel which is used in the second gear stage has to be adapted.

In other words, according to the invention it is possible to adapt the total transmission ratio of the gear transmission of the belt tensioner via the transmission ratio of the second gear stage, while further intermediate gear transmissions in all other gear stages remain particularly unchanged.

In accordance with the invention, the distance between the shaft associated with the first step wheel of the respective step wheel pairing and the shaft associated with the second step wheel of the respective step wheel pairing is equal for each of the step wheel pairings, and therefore is also referred to as "constant center distance".

In other words, according to the invention, a constant center distance is ensured, independently of each selected step wheel pairing, in order to standardize the design of the surrounding component parts of the belt tensioner.

The "constant center distance" can be defined by the following formula (1):

$$a = m_n \left( \frac{z_1 + z_2}{2 * \cos(\beta)} + x_1 + x_2 + \ldots + x_n \right)$$

wherein a denotes the shaft distance of the second gear stage, z1 denotes the number of teeth of the first step wheel, z2 denotes the number of teeth of the second step wheel, mn denotes the standard module, ß denotes the helix angle, and x1 to xn denote further toothing parameters such as profile modification factors.

In other words, according to the invention, it is particularly provided that the center distance for each of the step wheel pairings of the modular system is constant due the fact that the above-mentioned formula (1) is fulfilled for each of the step wheel pairings of the modular system.

Accordingly, in the event that all other parameters in formula (1), such as the standard module, the helix angle and the profile modification factors, remain constant between different step wheel pairings, only the sum of the number of teeth of the first step wheel and the second step wheel has to remain constant in each of the step wheel pairings.

When, however, at least one of the other parameters is modified for one of the step wheel pairings of the modular system, the sum of the number of teeth of the first step wheel and the second step wheel has to be adapted for said step wheel pairing in such a manner that a constant center distance a according to formula (1) continues to be ensured.

It is understood that the practically achievable center distance in a belt tensioner which is obtained using the modular system according to the invention can deviate from the theoretical value which was established by means of formula (1), based on absolutely necessary adaptations such as the backlash to be considered, for example.

In a variant, the sum of the numbers of teeth of the first step wheel and the second step wheel in the second gear stage is equal for each of the step wheel pairings. In such modular system, the complexity of the step wheel pairings to be provided is reduced, but an adaptation of the belt retractors to be manufactured using the modular system is only possible in such a manner that no adaptation to further parameters according to formula (1) is made.

The shafts which are associated with the respective step wheels are also part of the modular system.

In order to reliably fix the shafts, a synthetic material can be injected around them at the appropriate bearing point of the housing, that is, they can be fixed by an injection-molded connection.

Particularly preferred, each gearwheel for holding a shaft used in the belt tensioner includes an opening axially passing through the respective gearwheel, and a bearing point of the housing is assigned to each shaft, each distance between two of the shafts at a time being equal for each of the step wheel pairings.

In other words, all shaft distances in the belt tensioner are independent of the respective step wheel pairing. In this way, the number of required adaptations in the belt tensioner is minimized for the different step wheel pairings of the modular system, wherein, particularly preferentially apart from the particularly selected step wheel pairing, no further adaptation of components of the modular system is required.

The term "each gearwheel used in the belt tensioner" here and in the following additionally denotes the motor gearwheel, also referred to as motor pinion, and possible further gearwheels such as further step wheels.

In addition, also the center distance between a retractor shaft of a belt retractor of the belt tensioner from the shafts of the gearwheels inserted in the belt tensioner can be equal for each of the step wheel pairings.

In order to further facilitate the assembly of the belt tensioner, the first gear stage of the belt tensioner in the mounting position can be arranged to be closer to a lower side of the housing than the second gear stage.

In other words, in this variant, initially the motor including the motor pinion, then the first step wheel as well as possible further step wheels except the second step wheel, and subsequently the second step wheel can be mounted, i.e. inserted into the lower side of the housing, when the belt tensioner is manufactured.

The size of the identically designed housings is adapted in particular for holding the step wheel pairing with the highest space requirement. In other words, even the step wheel pairing that has the step wheels with the largest dimensions for achieving a desired transmission ratio can be inserted into the housing without any further adaptation.

The housings are specifically in the form of multi-part housings which comprise a housing cover that is arranged to close the housing after insertion of the spur gearing.

The housing cover can additionally provide bearing points which are associated with the gearwheels involved in the gear transmission of the belt tensioner or with the shafts extending through the gearwheels and ensure reliable fixation or alignment.

In a further variant, at least two meshing gearwheels of the spur gearing have a helical gear, particularly the first step wheel and the second step wheel.

The use of gearwheels having helical gears improves the quite running of the spur gearing and increases the service life thereof.

Preferably, both the motor gearwheel and the step wheels of the step wheel gearing have a helical gear. In other words, gearwheels with helical gears can be used in several gear stages, specifically in all gear stages.

In this case, the helix angle of the second gear stage can be determined depending on the helix angle of the first gear stage.

The term "helix angle of a gear stage" here and in the following means that the gearwheels involved in the respective gear stage, that is, the motor gearwheel and/or involved step wheels, for example, have a helical gear with the appropriate helix angle.

In order to realize a particularly long-lasting spur gearing with very quiet running, the overlap ratio of at least one helix gear cannot be integer. The combination of helix gears depending on each other in successive gear stages as well as at least one non-integer overlap ratio can help realize comparatively small helix angles, thereby allowing high axial loads acting upon the gearwheels and/or bearing points involved to be avoided or at least reduced.

Rather, it is possible in this variant that a desired load distribution and/or distribution of the mechanical loads occurring inside the spur gearing can be adjusted by the selection of the overlap ratio and by the resulting helix angle.

For example, the helix angle of at least one gear stage, specifically the second and each higher gear stage, is less than 10°.

The overlap ratio of at least one helical gear, preferably of each helical gear or each helical gear starting from the second gear stage, is specifically less than 1.

In a variant, the helix angle of the helical gear of the first gear stage is determined according to the following formula (2):

$$\beta_1 = \arcsin\left(\frac{F_{AxM} * d_{w1.1}}{T_M} * \frac{1}{b}\right)$$

wherein ß1 denotes the helix angle of the first gear stage, FA×M denotes the axial force acting on the motor gearwheel, dw1.1 denotes the pitch circle diameter of the motor gearwheel in the first gear stage, TM denotes the drive torque acting on the motor gearwheel, and 1/b denotes a predetermined fraction of the axial force FA×M acting on the motor gearwheel which is intended to act on the bearing point of the first gear stage.

It can be defined by the selection of an appropriate factor 1/b which loads the bearing point of the first gear stage has to withstand and, thus, how complex the respective bearing point has to be designed in order to safeguard a sufficient long-life cycle of the belt tensioner.

For example, the factor 1/b can be in the range from 0.4 to 0.8, and particularly in the range from 0.5 to 0.75.

In other words, b is e.g. in the range from 1.25 to 2.5, and particularly in the range from 1.33 to 2.0.

Preferably, the helix angle of each of the second or higher gear stage is determined according to the following formula (3):

$$\beta_x = \arcsin\left(\frac{(n-x+1) * d_{wx.1}}{(n-x+b) * d_{w(x-1).2}} * \sin(\beta_{(x-1)})\right)$$

wherein ßx denotes the helix angle of the respective gear stage x, n denotes the total number of the gear stages, dwx.1 denotes the pitch circle diameter of the pinion in the respective gear stage x, and dw(x−1).2 denotes the pitch circle diameter of the step wheel in the upstream gear stage (x−1).

The value of b in formula (3) is defined by the selection of the factor 1/b of formula (2). That is, the value of b in formula (3) is defined by the predetermined fraction 1/b of the axial force FA×M acting on the motor gearwheel that is to act upon the bearing point of the first gear stage.

In order to prevent incorrect assembly when manufacturing the belt tensioners using the modular system according to the invention, each of the step wheel pairings can include a visual identifier.

A unique identification mark can be attached as a visual identifier to the step wheels of the respective step wheel pairing, such as a part number, a part designation, a surface contouring, a barcode and/or a QR code.

In addition, or as an alternative, a color marker can be present as a visual identifier.

In a variant, the modular system comprises several electric motors which can be operated at different voltages, and/or one electric motor which can be operated at least at two different voltages, the electric motor being connected in the belt tensioner to the motor gearwheel for driving a motor gearwheel.

The use of the electric motor in the belt tensioner allows the belt tensioner to be designed as a reversible belt tensioner.

The control of the electric motor in the belt tensioner can be controlled using a current supplied to the electric motor.

For tensioning, the electric motor has to provide a high torque at high speed so that the belt can be tensioned with sufficient force and velocity.

The electric motors of the modular system can be operated particularly at a voltage of 12 V and/or 48 V.

Electric motors operated at 12 V can be used particularly for applications such as reducing the belt slack or implementing a warning function by selectively actuating the webbing, as a comparatively low shoulder force is sufficient for said applications.

If, for the application of full tensioning, an additional pyrotechnic set is used in the belt tensioner, it is not necessary to provide a more powerful electric motor. In this case, an electric motor operated at 12 V can thus be selected, along with a step wheel pairing that provides an adequate transmission ratio, from the modular system according to the invention.

Those electric motors operated at 12 V can be temporarily overloaded in a 48 V onboard power supply so that a high force can be provided over short periods of time, for example so that they can be used additionally in the event of full tensioning. However, an increased transmission ratio is required to withstand the higher torques generated by the overloaded electric motor. This can be easily accomplished by selecting an adequate step wheel pairing of the modular system without any further adaptations to the other components in the belt tensioner.

The term "short-term overload" in this case denotes in particular an overload over a period of 0.5 seconds or less.

It is also possible that at least one of the electric motors of the modular system is an electric motor having a target operating voltage of 48 V, i.e. being operated not only within the scope of a short-term overload at 48 V. Those electric motors require a smaller transmission ratio to generate the desired comparatively low shoulder forces for applications which do not correspond to the load case of a full tensioning. In this case, too, an appropriately designed belt tensioner can be easily manufactured by specifically selecting a suitable step wheel pair of the modular system without making further adaptations to the components of the belt tensioner.

The transmission ratio in the second gear stage can be in the range from 16 to 58, specifically in the range from 24 to 46, for each of the step wheel pairings.

In other words, the modular system according to the invention enables to cover a considerably wider range of transmission ratios without any complicated new designs of the components of the belt tensioner than it is the case with conventional belt tensioners.

In another variant, the step wheels of the step wheel pairings are manufactured using an injection molding process and/or using a sintering process.

In particular, the step wheels are manufactured as a complete component, i.e., the gearwheels of the respective step wheel for both gear stages in which the respective step wheel is involved, are produced simultaneously in one manufacturing step so that no further mounting steps are necessary.

Step wheels manufactured by means of injection molding processes are particularly made of synthetic material. Those step wheels can be manufactured at comparatively low cost, but are only suited for use at comparatively low maximum torques as compared to step wheels made of metal or metal alloys.

In order to produce step wheels made of synthetic material for different step wheel pairings in a low-cost and flexible manner, the step wheels of synthetic material can be manufactured by an injection molding die using interchangeable inserts. In this way, a flexible and customized production is facilitated by replacing the interchangeable inserts.

Step wheels manufactured by sintering processes are made particularly of a metal or a metal alloy. Those step wheels are more expensive to manufacture, but are suited for use at higher maximum torques as compared to step wheels made of synthetic material.

Further, the object of the invention is achieved by a belt tensioner that is manufactured by a modular system as afore-described.

BRIEF DESCRIPTION OF THE DRAWINGS

Further benefits and characteristics of the invention will result from the following description of exemplary embodiments which should not be understood in a limiting sense, and from the drawings, wherein.

DESCRIPTION

Figure 1:
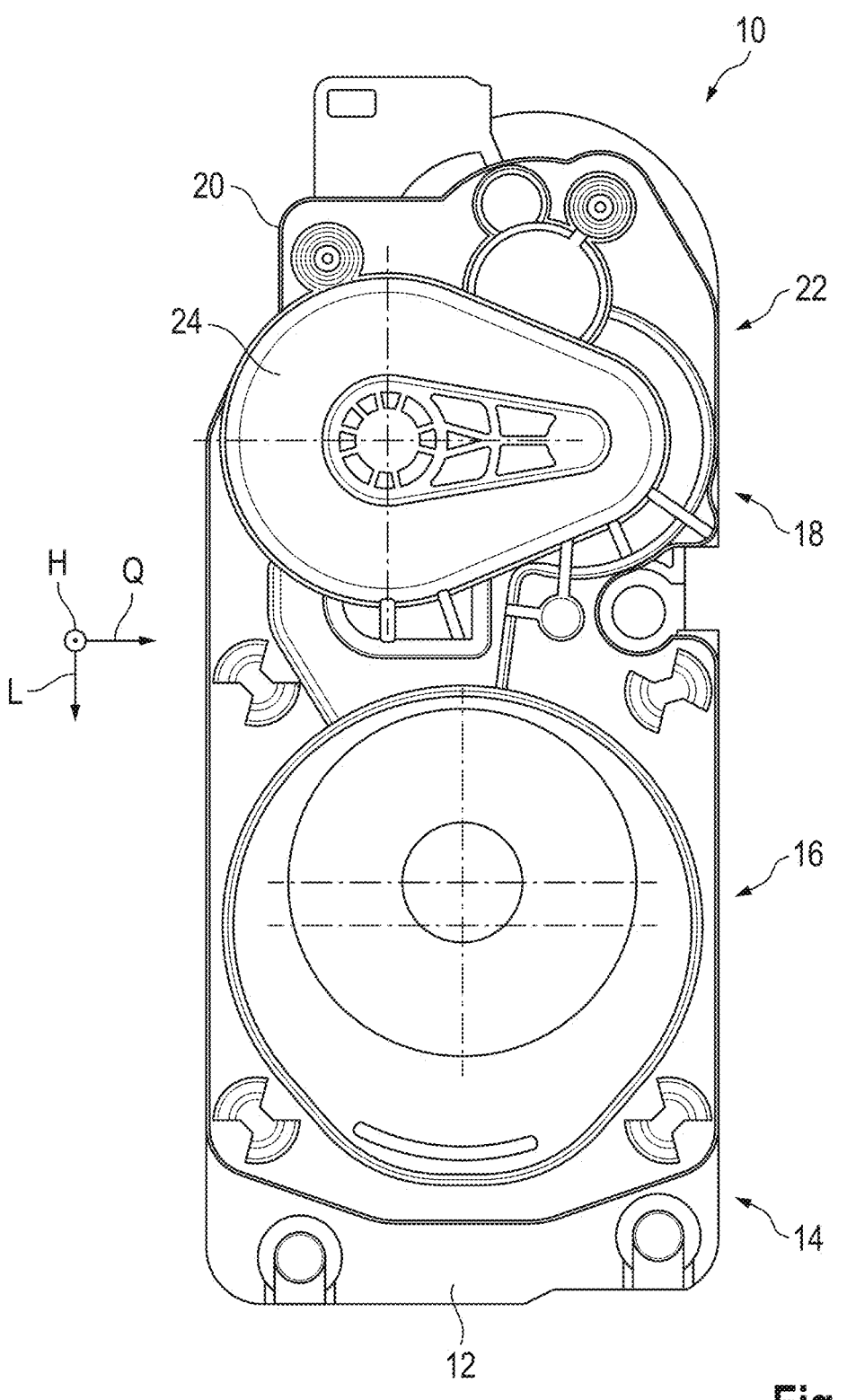
FIG. 1 shows a top view onto selected parts of a first embodiment of a belt tensioner according to the invention that was manufactured using a modular system according to the invention.

FIG. 1 illustrates a first embodiment of a belt tensioner 10 according to the invention that can be used in a seatbelt system, such as in a seatbelt system for vehicle occupants.

Figure 2:
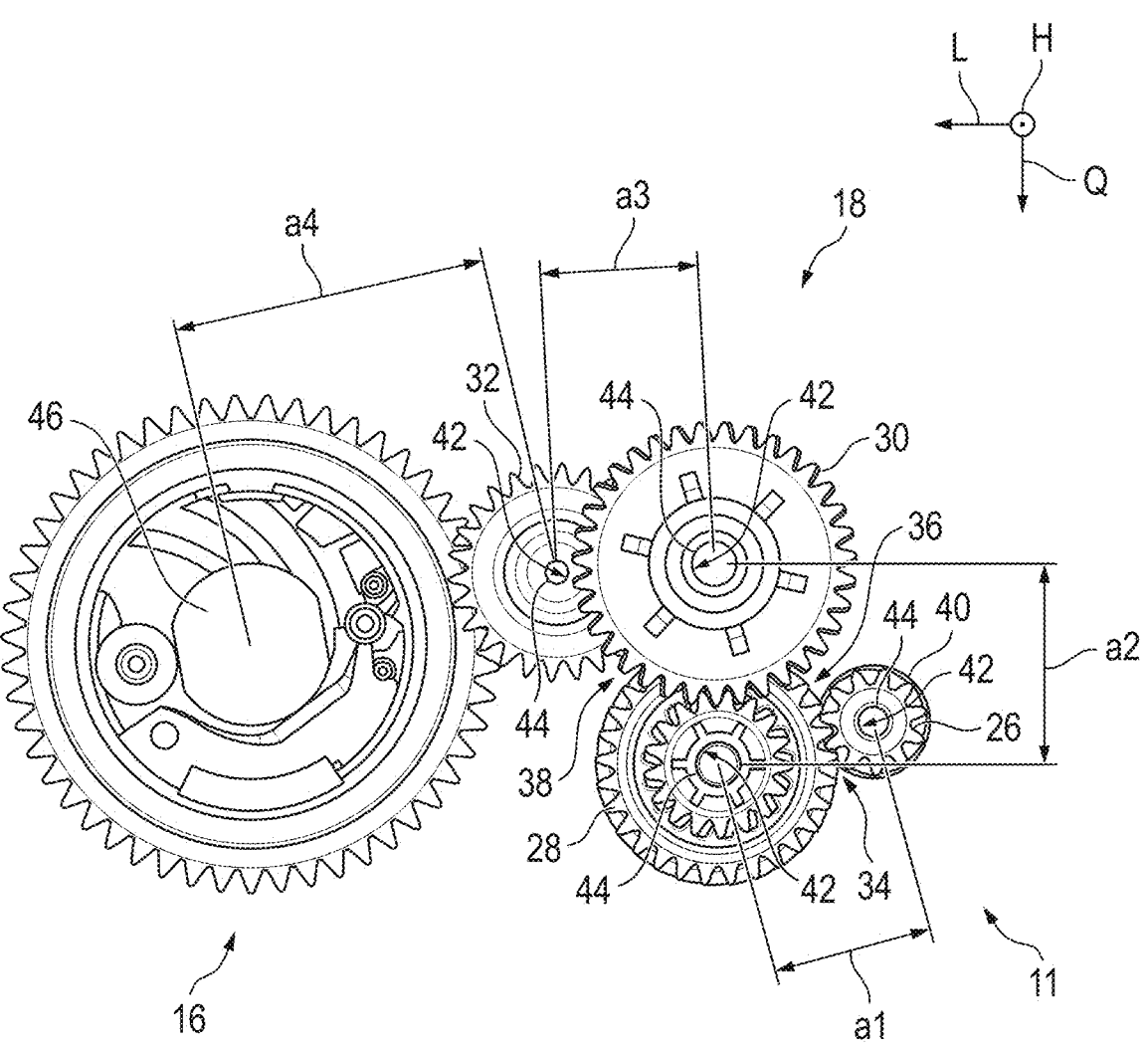
FIG. 2 shows a top view onto a step wheel gearing of the belt tensioner of FIG. 1.

The belt tensioner 10 is manufactured by a modular system 11 (see FIG. 2).

The belt tensioner 10 is connected to a frame 12 of a belt retractor 14 in which a belt reel 16 is rotatably supported to wind up, for example, webbing (not shown) and to eliminate a belt slack, when the belt retractor 14 is triggered.

The belt tensioner 10 has a spur gearing 18 which is held in a housing 20. The housing 20 comprises a lower side 22 of the housing 20 and a housing cover 24.

FIG. 2 illustrates a top view onto the spur gearing 18 which is used in the belt tensioner 10 of FIG. 1.

The spur gearing 18 is held in its mounting position in the housing 20 of the belt tensioner 10 (see FIG. 1), the modular system 11 comprising identically designed housings 20 into each of which a spur gearing 18 can be introduced.

It can be seen from FIG. 2 that the spur gearing 18 includes a motor gearwheel 26, also referred to as motor pinion, a first step wheel 28, a second step wheel 30 and a third step wheel 32.

The motor gearwheel 26 and the first step wheel 28 form a first gear stage 34, the first step wheel 28 and the second step wheel 30 form a second gear stage 36, and the second step wheel 30 and the third step wheel 32 form a third gear stage 38.

It is understood that the modular system 11 can also provide exclusively a first gear stage 34 and a second gear stage 36 or more than three gear stages.

In the shown embodiment, the motor gearwheel 26, the first step wheel 28, the second step wheel 30 and the third step wheel 32 are made by an injection molding process and are made of synthetic material.

Basically, the motor gearwheel 26, the first step wheel 28, the second step wheel 30 and/or the third step wheel 32 can also be made of a metal or a metal alloy and can be manufactured using a sintering process, for example.

The motor gearwheel 26 is driven by means of an electric motor 40 (indicated only schematically), wherein the motor gearwheel 26 can be driven either clockwise or anti-clockwise. In other words, the shown belt tensioner 10 is a reversible belt tensioner.

The modular system 11 has plural electric motors 40 which can be operated at different voltages.

The electric motor 40 of the first embodiment of the belt tensioner 10 is an electric motor that is designed for an operating voltage of 12 V. The operating voltage is provided, for example, via an onboard power supply of a vehicle (not shown) in which the belt tensioner 10 is installed.

All gearwheels involved in the spur gearing 18, i.e., the motor gearwheel 26, the first step wheel 28, the second step wheel 30 and the third step wheel 32, include an opening 42 axially passing through the respective gearwheel.

A shaft 44 associated with the corresponding gearwheel is arranged in each of said openings 42.

The distance between the shafts 44, also referred to as center distance, in FIG. 2 is referred to as $a1$, $a2$ and/or $a3$, wherein the center distance $a1$ indicates the distance between the shafts 44 of the motor gearwheel 26 and the first step wheel 28, the center distance $a2$ indicates the distance between the shafts 44 of the first step wheel 28 and the second step wheel 30, and the center distance $a3$ indicates the distance between the shafts 44 of the second step wheel 30 and the third step wheel 32.

In addition, in FIG. 2 a center distance $a4$ is plotted which denotes the distance between the shaft 44 of the third step wheel 32 and a retractor shaft 46 of the belt retractor 14.

The first step wheel 28 and the second step wheel 30 form a step wheel pairing of the modular system 11 according to the invention, the modular system 11 comprising plural step wheel pairings.

For each of the step wheel pairings, the number of teeth of the first step wheel 28 and the number of teeth of the second step wheel 30 are different from those of the other step wheel pairings, while the center distance $a2$ is equal for each of the step wheel pairings.

In the shown embodiment, moreover the sum of the numbers of teeth of the first step wheel 28 and the second step wheel 30 in the second gear stage 36 is equal for each of the step wheel pairings.

Basically, the number of teeth between different step wheel pairings can also be different from each other, as long as the resulting center distance can further be designed to be constant. For example, this is also possible by the selection of a helix angle, the standard module or the profile modification factor.

The total transmission ratio of the step wheel gearing 18 results as a product of the intermediate gear transmissions of all gear stages as well as the gear stage between the last step wheel and the belt retractor 14, i.e., between the third step wheel 32 and the belt retractor 14 in the shown embodiment.

For example, the spur gearing has a total transmission ratio of 32.

The modular system 11 according to the invention enables the total transmission ratio of the spur gearing 18 to be adapted and defined exclusively by a change of the step wheel pairing used, i.e., in the shown embodiment by the selection of the numbers of teeth of the first step wheel 28 and the second step wheel 30 in the second gear stage 36.

Thus, the center distances a1 to a4 can remain unchanged for each selected step wheel pairing so that no further components of the belt tensioner 10 have to be adapted when the total transmission ratio of the spur gearing 18 is to be adapted.

Figure 3:
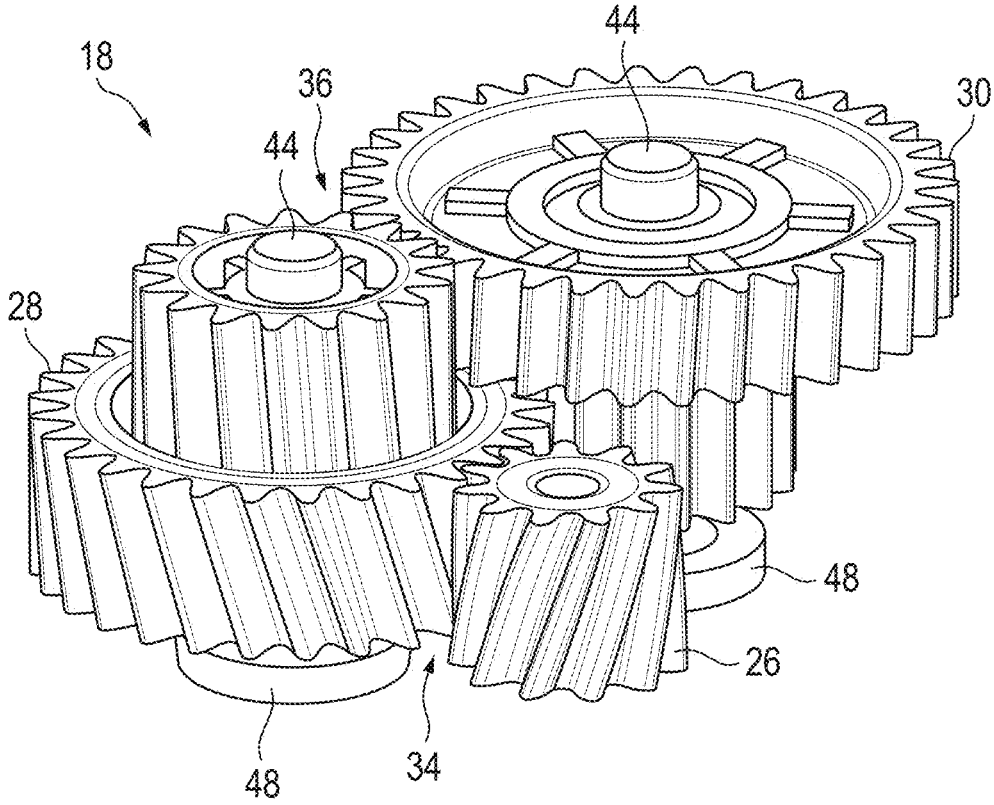
FIG. 3 shows a perspective view of parts of the step wheel gearing of FIG. 2.

FIG. 3 illustrates a perspective view of selected parts of the spur gearing 18 of FIG. 1.

In this representation, the shafts 44 which axially pass through the first step wheel 28 and the second step wheel 30 can be recognized even more clearly than in FIG. 2. In addition, it is evident that the shafts 44 each merge into a collar-type projection 38 at a lower axial end, the projections being assigned to bearing points (not shown in detail) of the lower side 22 of the housing 20 (see FIG. 1).

It can moreover be seen from FIG. 3 that the motor gearwheel 26, the first step wheel 28 and the third step wheel 30 have a helical gear.

The helical gear allows improved quiet running and a desired load distribution at the bearing points of the respective gearwheels by the selection of the overlap ratio and/or the helix angle of the helical gear.

Also, one can see that the first gear stage 34 is arranged to be closer to the lower side 22 of the housing 20 (see FIG. 1) than the second gear stage 36.

Figure 4:
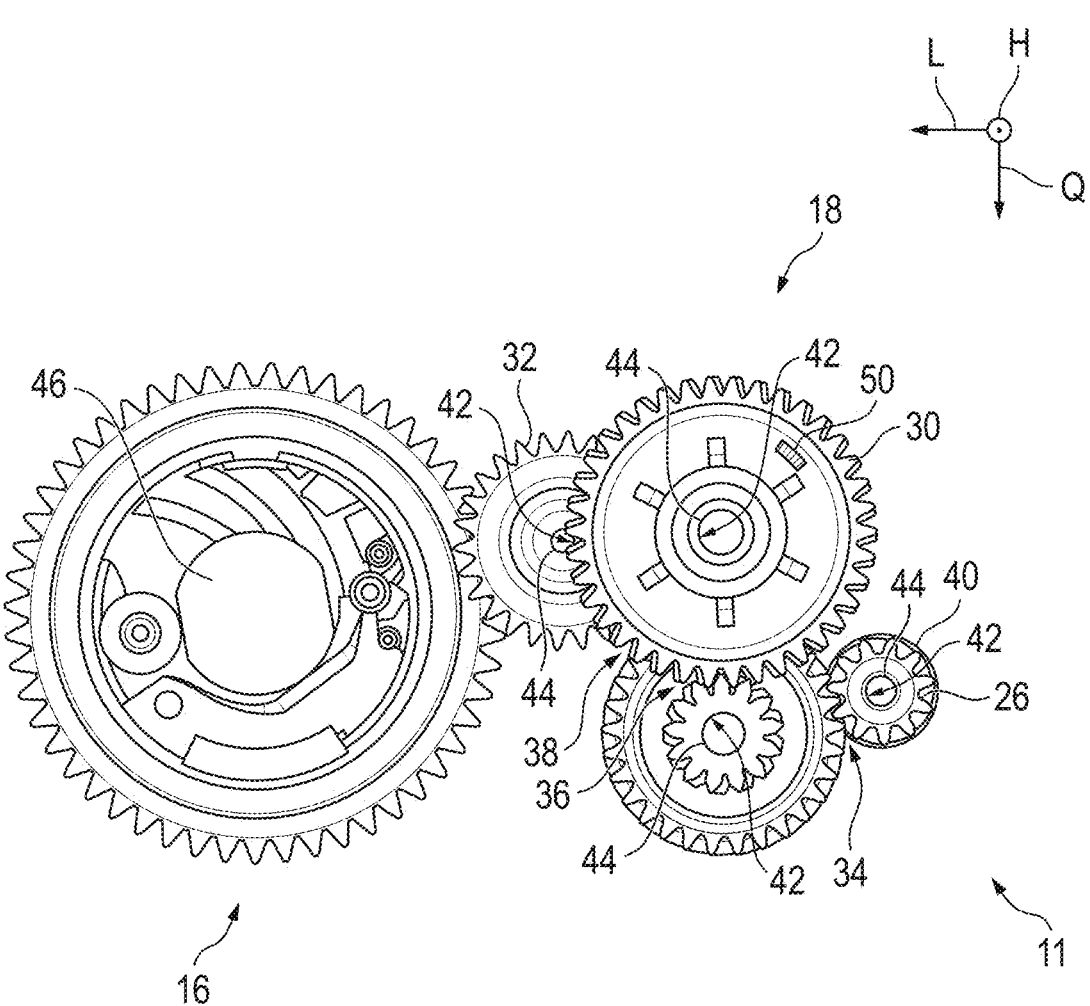
FIG. 4 shows a top view onto a step wheel gearing of a second embodiment of the belt tensioner according to the invention.

FIG. 4 represents a top view onto the step wheel gearing 18 of a second embodiment of the belt tensioner 10 which was manufactured by means of the modular system 11 according to the invention.

The second embodiment substantially corresponds to the first embodiment so that hereinafter only differences shall be discussed. Like reference signs characterize like component parts, and reference is made to the foregoing explanations.

In the second embodiment, the first step wheel 28 in the second gear stage 36 has a lower number of teeth and the second step wheel 30 in the second gear stage 36 has a larger number of teeth than in the first embodiment. In other words, in the manufacture of the belt tensioner 10, a different step wheel pairing was selected than for the first embodiment.

The further components of the step wheel gearing 18 are unchanged, however, in particular the transmission ratios in the first gear stage 34, in the third gear stage 38 and between the third step wheel 32 and the belt retractor 14 are equal.

Thus, the belt tensioner 10 of the second embodiment has a higher total transmission ratio than in the first embodiment, for example a total transmission ratio of 46.

The center distances between the gearwheels involved are equal to the first embodiment of the belt tensioner 10 so that no adaptations have to be made to the housing 20.

The second step wheel 30 in the second embodiment additionally includes an optical identifier 50 to avoid confusions with other second step wheels 30 of the modular system 11. In the shown embodiment, the optical identifier 50 is a barcode.

Basically, also a different clear identification mark, such as a part number, a part designation, a surface contouring, a QR code and/or a color marker, can be used as an optical identifier 50, however.

Due to the higher transmission ratio, the belt tensioner is suited, when the electric motor 40 operated at 12 V is used, to be inserted in a seatbelt system which is intended to allow repositioning of the vehicle occupant.

It is also possible to select an electric motor 40 of the modular system 11 which can additionally be operated at 48 V, for example by the electric motor 40 being temporarily overloaded. In this event, the webbing can be fully tensioned due to the higher transmission ratio of the belt tensioner 10 so that the use of additional pyrotechnic compositions can be dispensed with.

Figure 5:
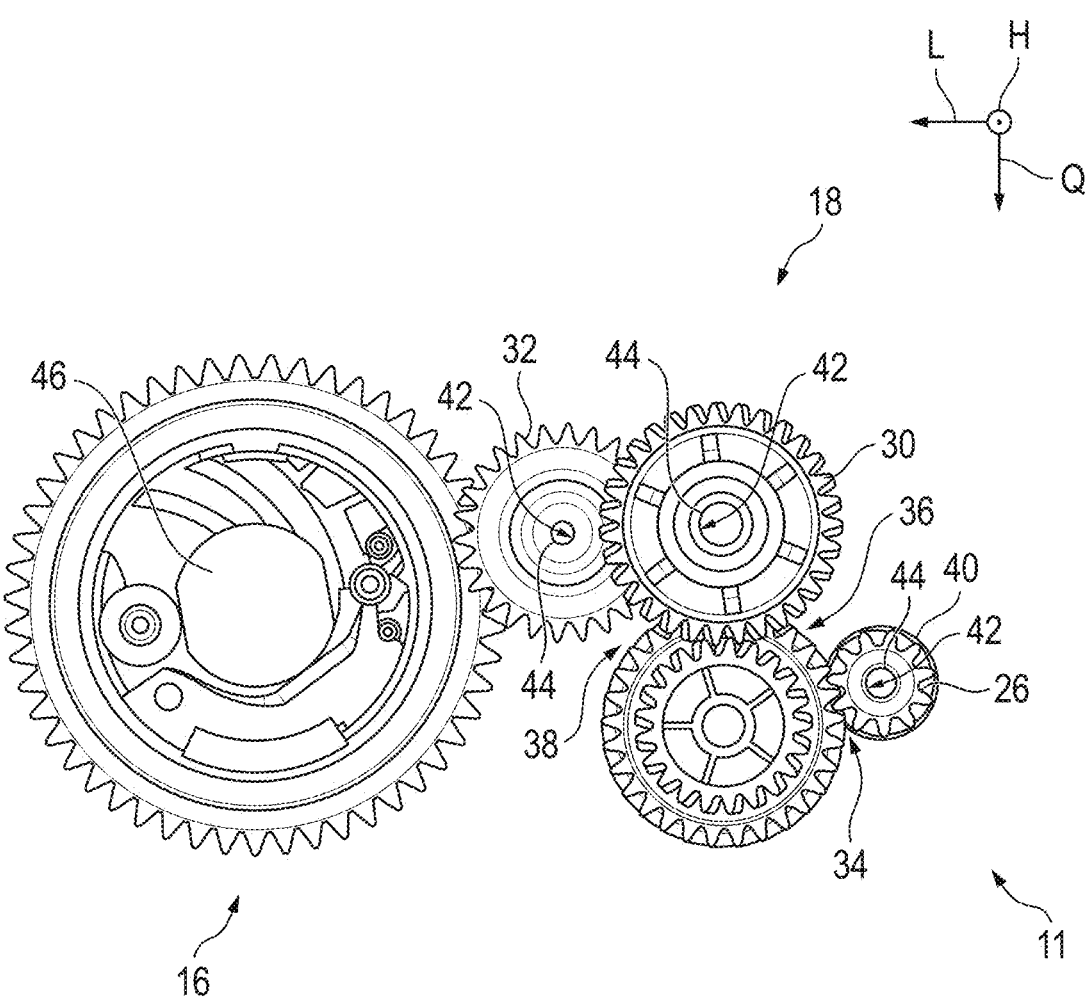
FIG. 5 shows a top view onto a step wheel gearing of a third embodiment of the belt tensioner according to the invention.

FIG. 5 represents a top view onto the step wheel gearing 18 of a third embodiment of the belt tensioner 10 that was manufactured using the modular system 11 according to the invention.

The third embodiment substantially corresponds to the first and second embodiments so that hereinafter only differences shall be discussed. Like reference numerals characterize like component parts, and the foregoing explanations are referred to.

In the third embodiment, the first step wheel 28 in the second gear stage 36 has a higher number of teeth, and the second step wheel 30 in the second gear stage 36 has a lower number of teeth than in the first embodiment. In other words, when manufacturing the belt tensioner 10, yet another step wheel pairing was selected than for the first and second embodiments.

The further components of the step wheel gearing 18, apart from the electric motor 40, are unchanged, however, in particular the transmission ratios in the first gear stage 34, in the third gear stage 38 and between the third step wheel 32 and the belt retractor 14 are equal.

Consequently, the belt tensioner 10 of the third embodiment has a lower total transmission ratio than in the first embodiment, for example a total transmission ratio of 24.

The center distances between the gearwheels involved are equal to the first and second embodiments of the belt tensioner 10 so that no adaptations have to be made to the housing 20.

Due to the lower transmission ratio, the belt tensioner 10 of the third embodiment is suited to make use of an electric motor 40 that is designed for operation at a voltage of 48 V, i.e., can generate a higher torque than an electric motor that is designed for operation at 12 V. The lower total transmission ratio allows the belt tensioner 10 to be further used for applications in which only low forces have to be generated, for example the reduction of the belt slack, whereas even for use scenarios in which high forces have to be generated, such a full tensioning, the same belt tensioner 10 can be used. In other words, the belt tensioner 10 of the third embodiment can make the use of pyrotechnic compositions superfluous.

The modular system 11 according to the invention allows to manufacture different belt tensioners 10 which are suitable for different desired use scenarios with low effort.

In particular, only those first step wheels 28 and second step wheels 30 which include the currently required number of teeth have to be manufactured in the ongoing production process, while the further components of the belt tensioner 10 can remain unchanged. Thus, a flexible and customized production of the belt tensioners 10 can be realized.

The invention claimed is:

1. A modular system for a belt tensioner (10) comprising a spur gearing (18), wherein the spur gearing (18) includes at least one motor gearwheel (26) and at least a first step wheel (28) and a second step wheel (30), the at least one motor gearwheel (26) forming a first gear stage (34) with the at least one first step wheel (28) and the at least one first step wheel (28) forming a second gear stage (36) with the at least one second step wheel (30), wherein the modular system (11) includes plural step wheel pairings of the at least one first step wheel (28) and the at least one second step wheel (30), wherein the modular system (11) includes identically designed housings (20) into each of which the spur gearing (18) with one of the step wheel pairings can be introduced, wherein each at least one first step wheel (28) and each at least one second step wheel (30) has an opening (42) axially passing through the respective step wheel (28, 30) for holding a shaft (44), a bearing point of the housing (20) being associated with each shaft (44), and wherein, for each of the step wheel pairings, the number of teeth of the at least one first step wheel (28) and the number of teeth of the at least one second step wheel (30) are different from those of the other step wheel pairings, but the distance between the shaft (44) of the at least one first step wheel (28) and the shaft (44) of the at least one second step wheel (30) is equal for each of the step wheel pairings.

2. The modular system according to claim 1, wherein the sum of the numbers of teeth of the at least one first step wheel (28) and the at least one second step wheel (30) in the second gear stage (36) is equal for each of the step wheel pairings.

3. The modular system according to claim 1, wherein each gearwheel (26, 28, 30, 32) inserted in the belt tensioner (10) has an opening (42) axially passing through the respective gearwheel (26, 28, 30, 32) for holding a shaft (44) and a bearing point of the housing (20) is associated with each shaft (44), and wherein each distance between two of the shafts (44) at a time is equal for each of the step wheel pairings.

4. The modular system according to claim 1, wherein the first gear stage (34) is arranged to be closer to a lower side (22) of the housing (20) than the second gear stage (36).

5. The modular system according to claim 1, wherein the size of the identically designed housings (20) is adapted to hold the step wheel pairing with the highest space requirement.

6. The modular system according to claim 1, wherein at least two meshing gearwheels (26, 28, 30, 32) of the spur gearing (18) have a helical gear, specifically the at least one first step wheel (28) and the at least one second step wheel (30).

7. The modular system according to claim 1, wherein each of the step wheel pairings includes a visual identifier (50).

8. The modular system according to claim 1, wherein the modular system (11) comprises plural electric motors (40) which can be operated at different voltages, and/or an electric motor (40) which can be operated at least at two different voltages, the electric motor (40) in the belt tensioner being connected to the motor gearwheel (26) for driving the motor gearwheel (26).

9. The modular system according to claim 1, wherein the step wheels (28, 30) of the step wheel pairings are manufactured using an injection molding process and/or using a sintering process.

10. A belt tensioner which is manufactured by the modular system (11) according to claim 1.

* * * * *